No. 866,482. PATENTED SEPT. 17, 1907.
W. W. KILPATRICK.
FLEXIBLE METALLIC COUPLING.
APPLICATION FILED NOV. 24, 1906.
2 SHEETS—SHEET 1.
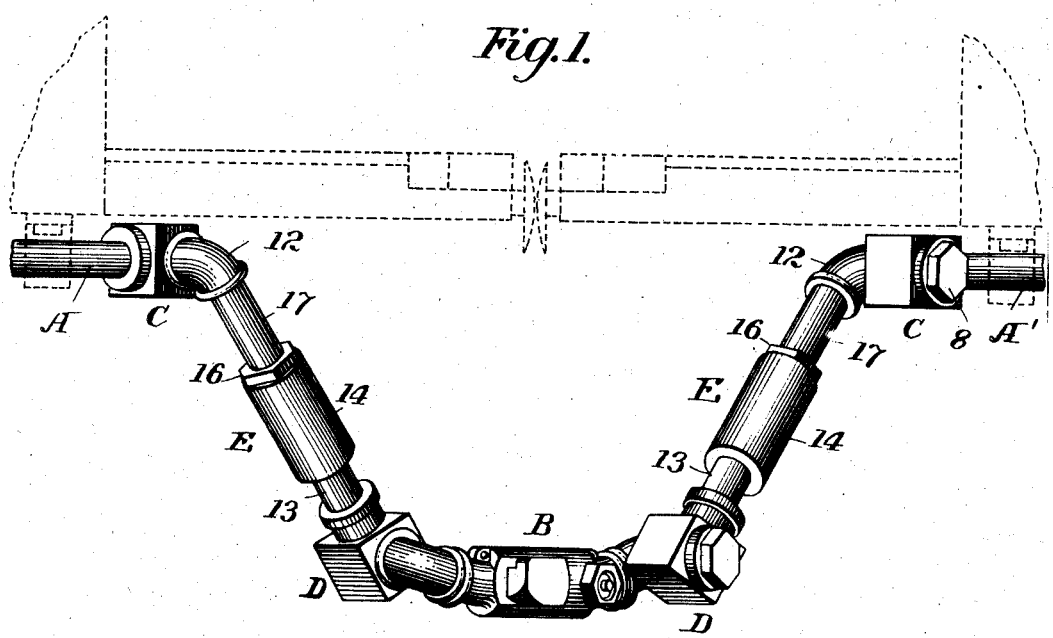
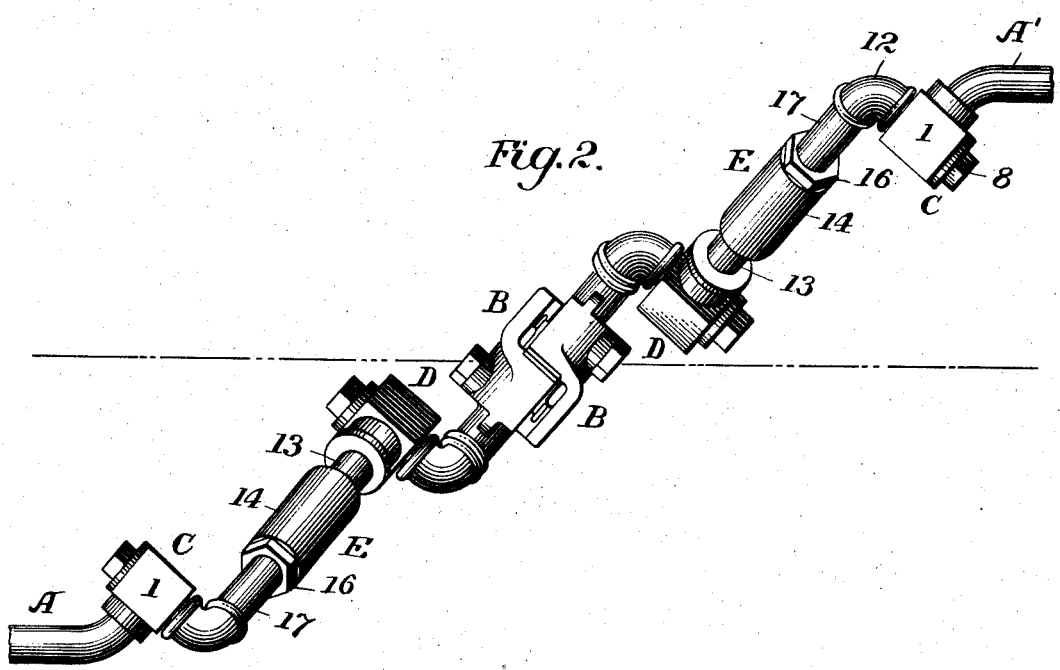

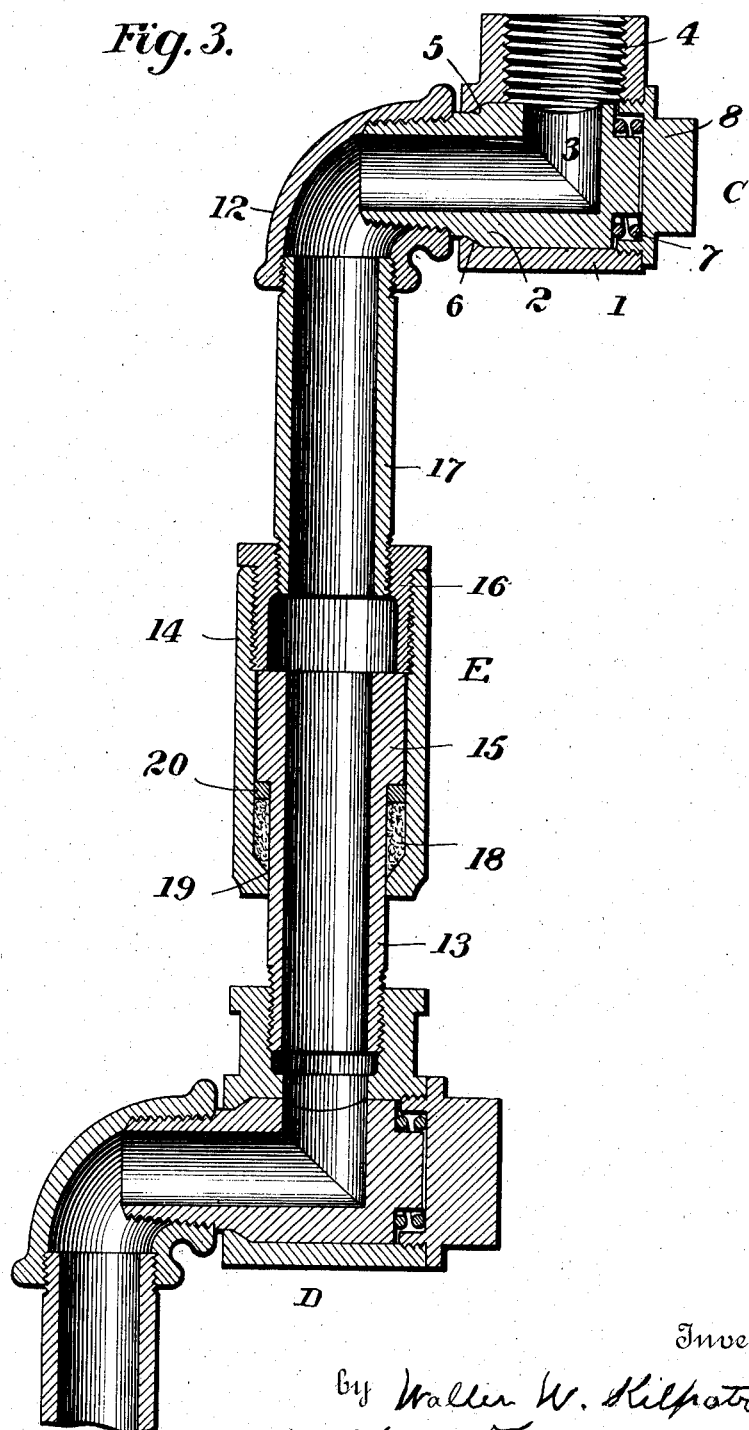

UNITED STATES PATENT OFFICE.

WALTER W. KILPATRICK, OF ATLANTA, GEORGIA, ASSIGNOR, BY DIRECT AND MESNE ASSIGNMENTS, TO AIR-BRAKE AND STEAM-HEAT CONNECTION COMPANY, OF ATLANTA, GEORGIA.

FLEXIBLE METALLIC COUPLING.

No. 866,482.　　　　Specification of Letters Patent.　　　Patented Sept. 17, 1907.

Application filed November 24, 1906. Serial No. 344,903.

*To all whom it may concern:*

Be it known that I, WALTER W. KILPATRICK, a citizen of the United States, residing at Atlanta, in the county of Fulton and State of Georgia, have invented certain new and useful Improvements in Flexible Metallic Couplings, of which the following is a specification.

My invention relates to flexible metallic pipe couplings, and consists of certain members jointed so as to swing about horizontal axes and rotatable about axes at right angles to the horizontal axes, and adapted to be arranged between a central connecting coupling and main pipes supported laterally and one in advance of the other as fully set forth hereinafter and as illustrated in the accompanying drawing, in which Figure 1 is an elevation illustrating my improved flexible pipe coupling as arranged between the main pipes of the steam brake apparatus of two cars. Fig. 2 is a plan view of Fig. 1. Fig. 3 is an enlarged section through the members of the device at one side of the central coupling.

While my improved flexible metallic coupling has features which permit of its use in different situations, it is primarily intended to be employed where there are two main pipes A A' substantially parallel on different planes laterally and one in advance of the other, as for instance in the steam pipes of a steam car brake, where each of the said main pipes is adjacent to the side of the car and where the different members or sections of the coupling devices are connected in a mid position by means of any suitable coupling B, an ordinary Gould coupling being shown.

At the end of each of the main pipes is a plug joint C having a casing 1 and a plug 2, which is closed at one end with a lateral port or opening 3 which communicates with a port 4 of the casing, the other end of the plug extending through the side of the casing. This plug has an annular face 5 adapted to an annular seat 6 of the casing fitting against the latter like a valve, but turning freely upon the same, and held thereto by means of a spring 7 intervening between the head of the plug and a screw cap 8 which closes the outer end of the socket in the casing.

Each plug joint C is so set that the plug is in a horizontal position and is connected to the pipe A A' at an angle to the line of said pipe, in most instances at an angle of about forty-five degrees, and the connections between each plug and the coupling B such that as a result of this arrangement the line of the flexible metallic coupling between the two main pipes A A' extends diagonally, that is, each metallic coupling section extends normally at an angle of about forty-five degrees to the line of the main pipe with which it is connected with advantages which will be hereinafter more fully set forth.

Connected with each member of the coupling B is the plug of a plug joint D, the plug being at right angles to the passage in the said coupling member, and between the inlet of each plug joint D and the adjacent plug joint C is a connecting pipe E which as shown, is connected by a right angle bend 12 with the plug of the joint C so that the line of the connecting pipe E is at right angles to the said plug and also to the plug of the joint D. As thus arranged there are two points of flexion between each member of the coupling B and the main pipes, these points being the axes of the two plugs of the joints C, D so that the parts can swing horizontally, but upon lines which are substantially at angles of about forty-five degrees to the lines of the main pipes.

For some purposes the connecting pipes E may be continuous between the plugs of the joints C and casings of the joints D, but where the main pipes can be carried laterally to and from each other, it is desirable to provide a rotatable connection in the line of connection between the joints, and I therefore make use of connecting pipes E each in two sections, one pipe section 13 being connected with the casing of the joint D, and the other pipe section 14 being connected with the bend 12 and plug of the joint C. As shown, for convenience of construction and assemblage, the section 13 consists of a straight pipe screwing at one end into the casing of the joint D and having a piston-like head 15 which fits within the interior of the section 14 the same being a shell to which is connected by a bushing 16 or otherwise the section 17 which screws into the bend 12.

In order to properly pack the joint between the two sections, a packing 18 is confined between a shoulder 19 of the shell 14 and a washer 20, upon which bears the shoulder of the head 15. This construction permits either section of the pipe E to be turned independently of the other while there is no longitudinal movement. It will be seen, therefore, that the coupling itself is horizontal but its axis is at an angle to the axial lines of the pipes A A' and that between each main pipe and the member of the coupling B to which it is connected there are three points of flexion, first, the horizontally rocking plug of the joint C, second, the horizontally rocking plug of the joint D, and third the rotatable independent sections of the connecting pipe E.

As a result of this construction, when the parts are coupled up as shown in Figs. 1 and 2, the main pipes may be brought closer together or carried apart longitudinally, or either may be brought to or from the other laterally without any strain whatever upon the intermediate flexible metallic connections, the three points of flexion permitting the parts to yield without any strain under any positions to which the parts may be carried in consequence of any change of the relative positions of the main pipes. It will further be seen that this capacity for the parts to accommodate themselves without strain is due in great part to the diagonal arrangement of the connections between the two main pipes, as there can be no thrust at right angles against any of the joints and that, therefore, the flexible connection is especially adapted for use in connection with the coupling of the pipes of the steam brake apparatus of railway trains.

Without limiting myself to the construction and arrangement of parts herein set forth I claim as my invention:

1. The combination with the longitudinally and laterally separated main pipes A A' and with a horizontal coupling arranged at an angle to the axes of the pipes A A', of a connection intermediate each coupling member and one of said pipes, the said connection having two plug joints, the plugs of which are each at an angle to the axis of the said pipe and a swiveled member intermediate the two plug joints.

2. The combination with a main pipe and one section or member of a coupling, of an intermediate metal pipe connection consisting of two plug joints, the plugs of which are at an angle of about forty-five degrees to the main pipe, and a swiveling section intermediate the plug joints.

3. The combination with a main pipe mounted at one side of a car, of a coupling member and a metallic connection intermediate such member, and the main pipe and extending normally at an angle of forty-five degrees to the said main pipe and including two plug joints and an intermediate swiveling pipe section.

In testimony whereof I affix my signature in presence of two witnesses.

WALTER W. KILPATRICK.

Witnesses:
CHARLES E. FOSTER,
ARTHUR L. BRYANT.